Dec. 20, 1927.
1,653,579
P. M. MARKO
STORAGE BATTERY ATTACHMENT
Filed July 24, 1926
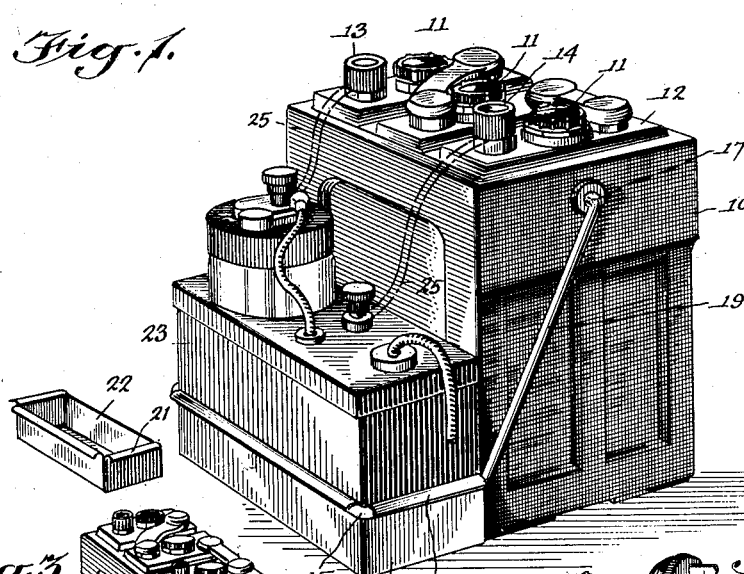
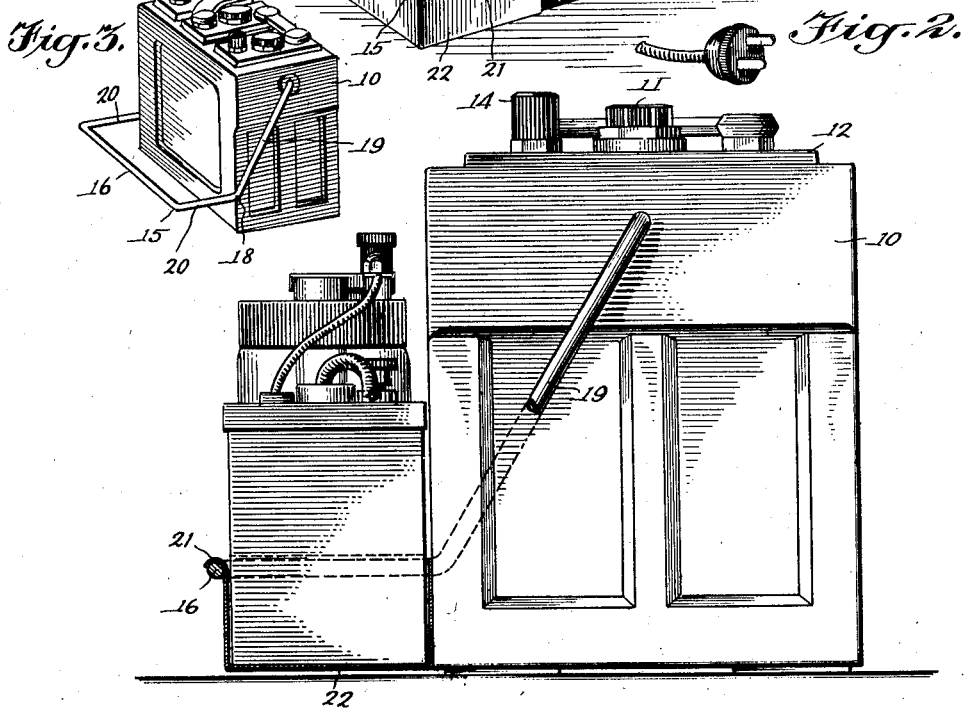
WITNESSES
INVENTOR
Paul M. Marko
BY
ATTORNEYS Patented Dec. 20, 1927.

1,653,579

UNITED STATES PATENT OFFICE.

PAUL M. MARKO, OF BROOKLYN, NEW YORK.

STORAGE-BATTERY ATTACHMENT.

Application filed July 24, 1926. Serial No. 124,738.

The present invention is concerned with the provision of an attachment for storage batteries which is primarily designed to permit the convenient temporary association of a so-called "trickle" charger with the battery.

The trickle chargers now in general use are popular principally because of the fact that they are inexpensive and light in weight. Their lightness, while facilitating handling, frequently results in the charger being accidentally upset, and in consequent damage to furniture and floor coverings when the acid in the charger is spilled.

In accordance with the present invention I provide means for so associating a charger with a storage battery that the danger of upsetting the charger is eliminated, the electrical connection of the charger and battery facilitated, and the danger of damage resulting from the overflow of the charger rendered negligible.

Preferably I utilize a specially constructed handle for the storage battery to carry a tray which receives the charger. The tray not only firmly secures the charger against tipping over, but catches any overflow in the event that too much water is placed in the charger. The charger and tray may be readily removed when it is desired to carry the battery by the handle.

Objects of the invention are to provide a battery attachment of this character, of simple, practical construction which will be rugged and durable in use, and which will lend itself readily to the requirements of economical manufacture.

With the above noted and other objects in view the invention consists in certain novel features of construction and combinations and arrangements of parts as will be more fully hereinafter described. In the drawings:

Fig. 1 is a perspective view of a storage battery with my improved attachment associated therewith and a charger carried by the attachment.

Fig. 2 is a view in end elevation of Fig. 1, part of the battery handle being broken away and the tray being shown in section.

Fig. 3 is a disassembled perspective view of the battery, handle and tray.

In the drawings I have used the reference character 10 to designate a storage battery case of conventional construction, the cells being provided with the usually filling openings 11 in the case cover 12. For the sake of convenience I preferably so design the battery cover that both the positive and negative binding posts 13 and 14 are presented at the same side of the cover, for a purpose to be later explained.

The battery case handle is in the nature of a swinging bail designated generally by the numeral 15. This bail includes a straight intermediate portion 16 and a pair of arms which straddle the battery case and have inwardly turned ends 17 serving as trunnions. The arms of the bail are angularly bent or offset intermediate their ends as indicated at 18 providing straight portions 19 at the pivoted ends of the arms and straight portions 20 joining the cross piece 16.

The angle of the arm portions 19 with the arm portions 20 is such that when the tray 22 is in place the portions 20 are normally disposed in an approximately horizontal plane. Handle portions 16 and 20 serve to support the hooked flanges 21 of the tray, the unflanged side of the tray abutting the battery case and the tray resting on the table or other support which carries case 10.

The tray is adapted to accommodate a conventional type of trickle charger 23. If the case is picked up independently of the handle, the pivotal mounting of the battery handle and the weight of the charger causes the tray and charger to be held gravitationally inwardly against the side of the battery case. Thus with the parts in the position of Fig. 1, the battery case might be manually grasped and lifted and the charger carried about with it since the charger itself will limit the inward swinging movement of the battery case handle.

By arranging both binding posts 13 and 14 of the battery at one side, short lengths of wire may be used for connecting the battery and charger, these conductors being indicated in dotted lines 25. Obviously there is no danger of upsetting the charger and if overflow occurs the pan 22 will catch the overflow. Pan 22 may be readily lifted out for purposes of cleaning or when the battery case is to be carried by its handle.

Obviously various changes and alterations might be made in the general form and arrangement of the parts described without departure from the spirit or scope of the appended claims.

I claim:

1. The combination with a storage battery including a pivoted handle bail, means adapted to be associated with the bail for supporting a charger.

2. The combination with a storage battery including a swinging handle bail the free end of which is offset, of a tray adapted to be detachably engaged with the offset portion of the handle for supporting a charger.

3. The combination with a storage battery including a swinging handle bail the free end of which is offset, of a tray adapted to be detachably engaged with the offset portion of the handle for supporting a charger, said handle being so offset that the tray and free end of the handle are disposed in horizontal position when the tray is swung inwardly against the side of the battery case by the weight of the charger.

4. The combination with a storage battery of an approximately U-shaped handle bail the legs of which are angularly bent and cooperate with the intermediate portion of the bail to provide a substantially horizontal frame, a tray detachably mounted in said frame and engageable with the wall of the battery to limit downward swinging movement of the bail.

5. The combination with a storage battery including a pivoted handle bail sufficiently long to embrace a charger pressed against one side of the battery, of means for effecting interengagement of the handle and the charger.

6. In a storage battery including a U-shaped handle bail, the free end of which is offset at such an angle that the free end of the handle is disposed in horizontal position when the handle is swung over a charger placed against the side of the battery.

7. The combination with a case, of an approximately U-shaped handle bail including an offset free end adapted in one position of adjustment of the bail to define a three sided horizontal frame adapted to be disposed at right angles to, and to cooperate with the wall of the case in retaining an article to be associated with the case.

PAUL M. MARKO.